US012689050B2

(12) United States Patent
Piszczek

(10) Patent No.: US 12,689,050 B2
(45) Date of Patent: Jul. 21, 2026

(54) METHOD FOR PRODUCING A CATALYST-COATED MEMBRANE

(71) Applicant: AUDI AG, Ingolstadt (DE)

(72) Inventor: Pascal Piszczek, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 311 days.

(21) Appl. No.: 18/004,044

(22) PCT Filed: Sep. 13, 2021

(86) PCT No.: PCT/EP2021/075033
§ 371 (c)(1),
(2) Date: Dec. 30, 2022

(87) PCT Pub. No.: WO2022/058259
PCT Pub. Date: Mar. 24, 2022

(65) Prior Publication Data
US 2023/0282858 A1     Sep. 7, 2023

(30) Foreign Application Priority Data

Sep. 17, 2020     (DE) ..................... 10 2020 124 218.2

(51) Int. Cl.
*H01M 8/1004*          (2016.01)
*H01M 8/1058*          (2016.01)
(Continued)

(52) U.S. Cl.
CPC ....... *H01M 8/1004* (2013.01); *H01M 8/1058* (2013.01); *H01M 8/1062* (2013.01); *H01M 8/1069* (2013.01); *H01M 2300/0082* (2013.01)

(58) Field of Classification Search
CPC ............. H01M 8/1004; H01M 8/1058; H01M 8/1062; H01M 8/1069; H01M 2300/0082
See application file for complete search history.

(56) References Cited

U.S. PATENT DOCUMENTS

2002/0068213 A1     6/2002  Kaiser et al.
2004/0086632 A1*    5/2004  Vlajnic .................. B01D 69/06
                                                                118/308
(Continued)

FOREIGN PATENT DOCUMENTS

DE     102017123939 A1     4/2018
DE     102010054274 B4     1/2019
(Continued)

OTHER PUBLICATIONS

Machine translation of KR20200002144 (Year: 2025).*
(Continued)

*Primary Examiner* — Nicholas P D'Aniello
*Assistant Examiner* — Albert Michael Hilton
(74) *Attorney, Agent, or Firm* — Seed Intellectual Property Law Group LLP

(57)          ABSTRACT

A method for producing a catalyst-coated membrane includes: preparing and/or providing a first ink having a first ink composition, comprising substrated catalyst particles, proton-conducting ionomer and dispersing agent, in which the fraction of the substrated catalyst particles remains behind the fraction of the proton-conducting ionomer; preparing and/or providing at least one second ink having a second ink composition, comprising the substrated catalyst particles, the proton-conducting ionomer and the dispersing agent, in which the fraction of the proton-conducting ionomer remains behind the fraction of the substrated catalyst particles; unwinding a weblike proton-conducting membrane material provided on a roll; applying at least one layer of the first ink with a first application tool onto at least one section of the membrane material; and applying at least one layer of the second ink with a second application tool onto an outermost layer of the first ink, deposited onto the membrane material.

9 Claims, 3 Drawing Sheets

(51) Int. Cl.
  H01M 8/1062 (2016.01)
  H01M 8/1069 (2016.01)

(56) References Cited

U.S. PATENT DOCUMENTS

| | | | | |
|---|---|---|---|---|
| 2008/0206616 A1* | 8/2008 | Atanassova | ......... | H01M 4/8882 |
| | | | | 429/479 |
| 2009/0239116 A1 | 9/2009 | Okumura et al. | | |
| 2010/0221639 A1 | 9/2010 | Oota | | |
| 2018/0261852 A1* | 9/2018 | Gumeci | .............. | H01M 4/8828 |
| 2019/0245215 A1* | 8/2019 | Sousa | ...................... | B05D 7/04 |

FOREIGN PATENT DOCUMENTS

| | | | | | |
|---|---|---|---|---|---|
| EP | 1624514 | B1 | 4/2013 | | |
| JP | 2018206626 | A | * 12/2018 | .......... | H01M 4/8663 |
| KR | 20080008855 | | * 1/2008 | | |
| KR | 20200002144 | | * 1/2020 | | |
| WO | WO 0243171 | A2 | 5/2002 | | |
| WO | WO 2008106504 | A2 | 9/2008 | | |
| WO | WO 2016149168 | A1 | 9/2016 | | |

OTHER PUBLICATIONS

Machine translation of KR20080008855 (Year: 2025).*
Machine translation of JP-2018206626-A (Year: 2026).*
International Search Report, mailed Dec. 14, 2021, for International Patent Application No. PCT/EP2021/075033. (2 pages).
Written Opinion of the International Searching Authority, mailed Dec. 14, 2021, for International Patent Application No. PCT/EP2021/075033. (7 pages).
Litster et al., "PEM fuel cell electrodes," Journal of Power Sources 130(1-2):61-76, May 3, 2004. (16 pages).

* cited by examiner

METHOD FOR PRODUCING A CATALYST-COATED MEMBRANE

BACKGROUND

Technical Field

Embodiments of the invention relate to a method for producing a catalyst-coated membrane (CCM).

Description of the Related Art

Fuel cell devices are used for the chemical transformation of a fuel with oxygen to form water, in order to generate electrical energy. For this, fuel cells contain as their core component a proton-conducting (electrolyte) membrane, associated with electrodes. In the operation of the fuel cell device having a plurality of fuel cells assembled into a fuel cell stack, the fuel, especially hydrogen ($H_2$) or a hydrogen-containing gas mixture is supplied to the anode. In the case of a hydrogen-containing gas, the gas is at first reformed, thus providing hydrogen. At the anode, an electrochemical of $H_2$ to $H^+$ occurs, giving off electrons. The electrons provided at the anode are taken by an electrical conduit to the cathode. The cathode is supplied with oxygen or an oxygen-containing gas mixture, so that a reduction of 02 to 02-occurs, taking up the electrons.

Documents WO 2008 106 504 A2, WO 2016 149 168 A1 and WO 2002 043 171 A2 describe the industrial fabrication of catalyst-coated membranes, wherein the membrane is furnished in the form of a web in order to be subsequently coated with electrode material. In particular, WO 2008 106 504 A2 proposes a coating of the membrane material from one roll to another, different ink compositions being used for the coating of the substrate.

BRIEF SUMMARY

In operation of the fuel cell, it has been discovered that the majority of the moisture or liquid is present on the cathode side of the membrane electrode assembly, so that an efficient water management is necessary by suitable composition of the catalyst layer.

Some embodiments modify a method for producing a catalyst-coated membrane so that there is a better particle distribution of the catalyst particles and thus a better efficiency and a better water management of the fuel cell.

In some embodiments, a method comprises:

preparing and/or providing a first ink having a first ink composition, comprising substrated catalyst particles, proton-conducting ionomer and dispersing agent, in which the fraction of the substrated catalyst particles remains behind the fraction of the proton-conducting ionomer, preparing and/or providing at least one second ink having a second ink composition, comprising the substrated catalyst particles, the proton-conducting ionomer and the dispersing agent, in which the fraction of the proton-conducting ionomer remains behind the fraction of the substrated catalyst particles, unwinding a weblike proton-conducting membrane material provided on a roll, applying at least one layer of the first ink with a first application tool onto at least one section of the membrane material, and applying at least one layer of the second ink with a second application tool onto an outermost layer of the first ink, deposited onto the membrane material.

This method is characterized in that it uses a multistaged process with different ink formulations, wherein the ink having direct contact with the membrane has a larger fraction of the ionomer and thus a smaller fraction of catalyst particles, while the ink further away from the membrane is prepared with a smaller fraction of ionomer and a larger fraction of catalyst particles. In this way, an efficient water management is possible and a catalyst coated membrane can be industrially produced in effective manner for use in a fuel cell. Another important advantage is the faster reactivity on the outer layer of the respective electrode, since in this way there is a larger fraction of particles and thus a larger fraction of catalysts there for the fuel cell reaction. This is especially advantageous because many such membrane electrode assemblies are needed for use, for example, in motor vehicles, in order to provide the desired power.

It should be pointed out that a number of three or more inks can also be used and therefore the present disclosure is not limited to two inks and two ink compositions.

In order to apply the cathode and the anode onto the membrane at the same time, it has proven to be advantageous for the first ink to be applied with the first application tool on both sides of the membrane material, and subsequently in time to apply the second ink with the second application tool on both sides of the respectively outermost layer of the first ink deposited on the membrane material.

It is possible to take the membrane material coated with the first ink to an intermediate drying unit, in which the first ink is dried before the second ink is deposited. In this way, a blending of the individual ink coatings can be avoided, so that a defined distribution of catalyst particles is present in each ink coating.

The manufacturing process can be accelerated in that the intermediate drying unit is designed to dry the first ink only partly, so that only a dry marginal film of first ink is produced, on which the second ink is deposited. In this way, the process time is shortened, since only a portion of the first ink is dried, and the second ink can be deposited on this, without the two inks becoming blended.

It has proven to be advantageous to perform a layer thickness measurement for the layer of the first ink after the depositing of the first ink. This layer thickness measurement can be done dry or also wet, for example. Using the information as to the layer thickness of the first ink on the membrane material it is possible to regulate various parameters having influence on the later electrochemical reaction. For example, if the deposition of the first ink is too thick, it can be arranged to deposit less of the first ink on subsequent sections of the membrane material so as to reduce the layer thickness of subsequent membrane material sections with first ink. In this way, it is thus possible to deposit the first ink on subsequent sections of the membrane material in dependence on the measured layer thickness of preceding sections of the membrane material.

On the whole, however, a final (limit) electrode thickness may be specified, so that it has proven to be advantageous for the second ink deposited thereafter to be deposited in dependence on the measured layer thickness of the first ink in order to limit the electrode thickness.

It is also possible to perform a layer thickness measurement of the electrode thickness after applying the second ink, and to apply the second ink on subsequent sections of the membrane material in dependence on the measured electrode thickness. In this way, it is also possible to maintain a limit electrode thickness.

In order to better handle the membrane material and wind it up, it has proven to be advantageous to take the membrane material coated with the ink to a drying unit, in which the coating is fully dried.

Moreover, it is advantageous to determine the catalyst particle charge of the membrane material coated with the ink by means of an X-ray fluorescence analysis, and to adjust the fraction of substrated catalyst particles in the inks as a function of the measured catalyst particle charge. In this way, a surplus or a deficiency of catalyst particles in the inks can be influenced in good time, so that it is possible to reduce the amount of the surplus, i.e., the defectively produced catalyst-coated membranes.

In order to counteract fluctuations in ink quality it is alternatively or additionally possible to measure the layer thickness with the layer thickness meters, and it can be concluded from the individual measured layer thicknesses, given the known ink compositions, which catalyst content is dominant in the membrane electrode assembly so produced. This catalyst content reflects the fraction of the substrated catalyst particles in the inks.

In order to counteract fluctuations in ink quality it is alternatively or additionally possible to have a charge measuring device (such as an X-ray fluorescence apparatus) in order to determine directly the catalyst content. This catalyst content reflects the fraction of the substrated catalyst particles in the inks.

The catalyst content can also be determined by a combination measurement technique, utilizing both the at least one layer thickness meter and the charge measuring device.

For later use in a fuel cell stack, it has proven to be advisable to cut up the membrane material coated with the inks into individual catalyst-coated membranes.

The features and combinations of features mentioned above in the specification and also the features and combinations of features mentioned below in the description of the figures and/or shown only in the figures can be used not only in the particular indicated combination, but also in other combinations or standing alone. Thus, embodiments not explicitly shown or discussed in the figures, yet which emerge from and can be created from the explained embodiments by separate combinations of features should be seen as also being encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

DETAILED DESCRIPTION

Figure 1:
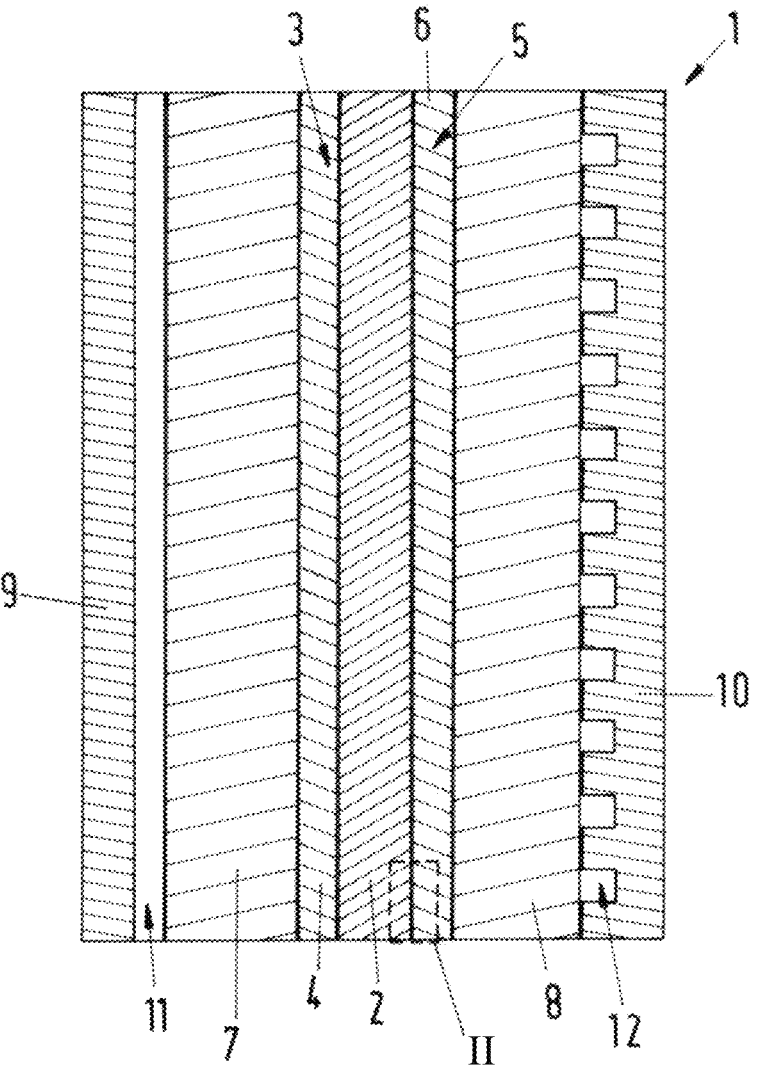
FIG. 1 shows a schematic representation of the structure of a fuel cell.

FIG. 1 shows a fuel cell 1. A semipermeable electrolyte membrane 2 here is covered on a first side 3 with a first electrode 4, in the present case the anode, and on a second side 5 with a second electrode 6, in the present case the cathode. The first electrode 4 and the second electrode 6 comprise substrate particles 14, on which catalyst particles 13 of precious metals or mixtures containing precious metals such as platinum, palladium, ruthenium or the like are arranged or substrated. These catalyst particles 13 serve as reaction accelerants in the electrochemical reaction of the fuel cell 1. The substrate particles 14 may contain carbon. Yet substrate particles 14 may also be considered which are formed from a metal oxide or carbon with an appropriate coating. In such a polymer electrolyte membrane fuel cell (PEM fuel cell), fuel or fuel molecules, especially hydrogen, are split up into protons and electrons at the first electrode 5 (anode). The electrolyte membrane 2 lets through the protons (e.g., $H^+$), but is impenetrable to the electrons ($e^-$). The electrolyte membrane 2 in this embodiment is formed from an ionomer, such as a sulfonated tetrafluorethylene polymer (PTFE) or a polymer of perfluorinated sulfonic acid (PFSA). At the anode, the following reaction occurs: $2H_2 \rightarrow 4H^+ + 4e^-$ (oxidation/electron surrender).

While the protons pass through the electrolyte membrane 2 to the second electrode 6 (cathode), the electrons are taken by an external circuit to the cathode or to an energy accumulator. At the cathode, a cathode gas is provided, especially oxygen or oxygen-containing air, so that the following reaction occurs here: $O_2 + 4H^+ + 4e^- > 2H_2O$ (reduction/electron uptake).

In the present case, the electrodes 4, 6 are each associated with a gas diffusion layer 7, 8, one gas diffusion layer 7 being associated with the anode and the other gas diffusion layer 8 with the cathode. Moreover, the anode-side gas diffusion layer 7 is associated with a flow field plate, shaped as a bipolar plate 9, for supply of the fuel gas, having a fuel flow field 11. By means of the fuel flow field 11, the fuel is supplied through the gas diffusion layer 7 to the electrode 4. At the cathode side, the gas diffusion layer 8 is associated with a flow field plate having a cathode gas flow field 12, likewise shaped as bipolar plate 10, for supply of the cathode gas to the electrode 6.

Figure 2:
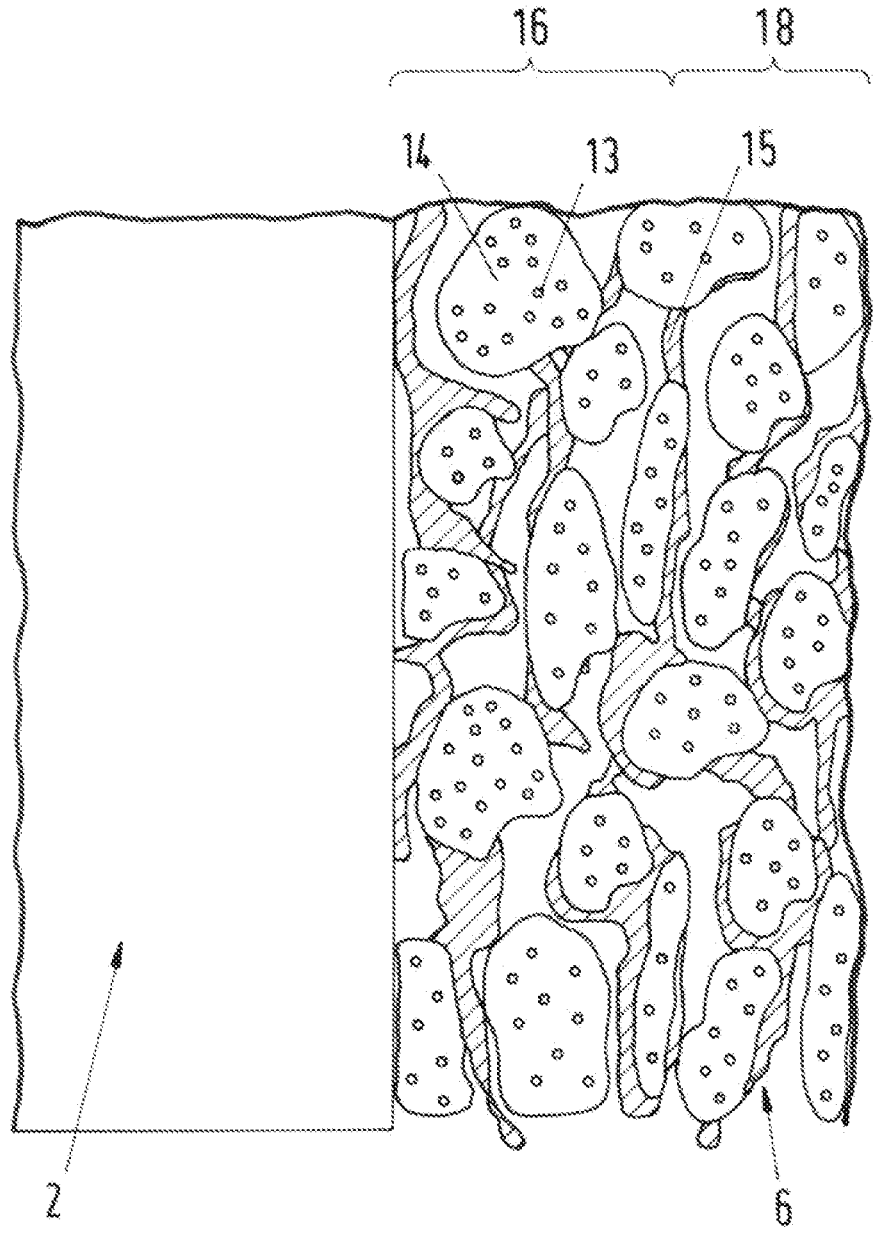
FIG. 2 shows a merely schematic detail view II of an electrode from FIG. 1.

The electrodes 4, 6 in the present instance are formed with a multitude of catalyst particles 13, which can be formed as nanoparticles, such as "core-shell nanoparticles." These have the advantage of a large surface, while the precious metal or the precious metal alloy is arranged only on the surface, and a less valuable metal, such as nickel or copper, forms the core of the nanoparticle The catalyst particles 13 are arranged or substrated on a multitude of electrically conducting substrate particles 14. Furthermore, between the substrate particles 14 and/or the catalyst particles 13 there is present an ionomer binder 15, which may be formed from the same material as the membrane 2. This ionomer binder 15 may be formed as a polymer or ionomer containing a perfluorinated sulfonic acid. The ionomer binder 15 in the present case is in porous form, having a porosity of more than 30 percent. This ensures, especially on the cathode side, that the oxygen diffusion resistance is not increased, thus making possible a lower charging of the catalyst particle 13 with precious metal or a lower charging of the substrate particle 14 with catalyst particles 13 (FIG. 2).

In the following, a method will be described for producing a catalyst-coated membrane (CCM). At first, a first ink 16 is prepared and/or provided, comprising a first ink composition containing substrated catalyst particles 13, proton-conducting ionomer 15 and dispersing agent. The ionomer 15 may be formed from the same material as the membrane 2. The dispersing agent can be isopropanol or acetone, for example. In this first ink 16, the fraction of the substrated catalyst particles remains behind the fraction of the proton-conducting ionomer 15. Moreover, a second ink 18 is prepared or provided, comprising an ink composition containing the substrated catalyst particle 13, the proton-conducting ionomer 15 and the dispersing agent. In this second ink 18, the fraction of the proton-conducting ionomer 15 remains behind the fraction of the substrated catalyst particles 13. "Remaining behind" may mean a difference in the fractions of at least 10 percent, at least 30 percent, or at least 50 percent.

Figure 3:
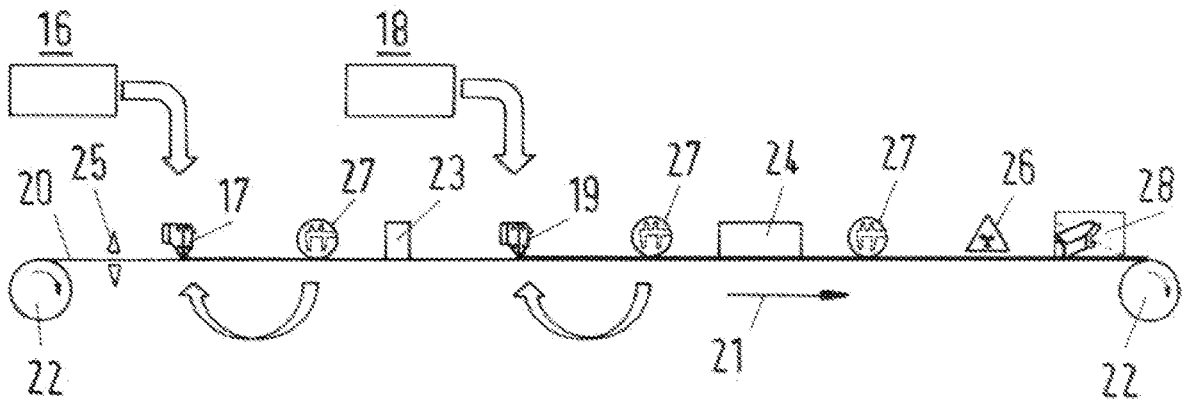
FIG. 3 shows a schematic representation of a device for producing a catalyst-coated membrane in a side view.

As shown by FIG. 3, a weblike proton-conducting membrane material provided on a roll 22 is unwound and taken in a delivery direction 21 at first to a foil cleaning unit 25, where the membrane material 20 is made free of dust and deposits. After this, the membrane material 20 is transported further in the delivery direction 21 to a first application tool 17, with which the first ink 16 is deposited on at least one section, such as on the entire membrane material 20. After the first application tool 17 in the delivery direction 21 there is performed a layer thickness measurement of the layer of the first ink 16 by means of a layer thickness meter 27. After the first application tool 17 in the delivery direction 21 there is provided an intermediate drying unit 23, in order to dry the first ink 16 before it is imprinted with an additional ink. The intermediate drying unit 23 shown in the present case is designed to dry the first ink 16 only partly, so as to form there a dry marginal film of the first ink 16 before the second ink 18 is then deposited in the delivery direction 21 with a second application tool 19 onto an outermost layer of the first ink 16 deposited on the membrane material 20. After the second application tool 19 in the delivery direction 21 there is once again a layer thickness meter 27, in order to measure the electrodes 4, 6 formed from the first ink 16 and the second ink 18. With this layer thickness meter 27, a measurement of the wet film thickness can be done. After the second application tool 19 in the delivery direction 21 there is provided a drying unit 24, which is designed to fully dry the membrane material 20 coated with the inks 16, 18. After the drying unit 24 in the delivery direction 21 there is arranged a further layer thickness meter 27, which can measure the dried electrode film, for example, by means of an optical layer thickness measuring head. In addition, there is an X-ray fluorescence analysis unit 26, which determines the catalyst particle charge of the membrane material 20 coated with the inks 16, 18, whereupon the fraction of substrated catalyst particles 13 in the inks 16, 18 can then be adjusted in dependence on the measured catalyst particle charge. Before the coated membrane material 20 is rolled up once more on the further roll 22, it is taken past a unit for defect marking 28, with which any holes in the electrode layers or such defects can be marked, so that during the subsequent cutting up of the membrane material into individual catalyst-coated membranes it is ensured that these do not have a defective coating.

As a result, it is possible with the method described herein to produce on an industrial scale membrane electrode assemblies which are coated with catalyst pastes or inks 16, 18, so that these can be prepared in large lot numbers. The catalyst-coated membrane produced as described herein is characterized by an improved water management. Furthermore, the method can be carried out quickly with reduced cycle time to produce the individual fuel cells.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a catalyst-coated membrane, comprising:
    preparing and/or providing a first ink having a first ink composition, comprising substrated catalyst particles, proton-conducting ionomer and dispersing agent, in which an amount of the substrated catalyst particles in the first ink is less than an amount of the proton-conducting ionomer in the first ink;
    preparing and/or providing at least one second ink having a second ink composition, comprising the substrated catalyst particles, the proton-conducting ionomer and the dispersing agent, in which an amount of the proton-conducting ionomer in the second ink is less than an amount of the substrated catalyst particles in the second ink;
    unwinding a weblike proton-conducting membrane material provided on a roll;
    applying at least one layer of the first ink with a first application tool onto at least one section of the weblike proton-conducting membrane material;
    taking of the weblike proton-conducting membrane material, which is at least partially coated with the first ink, to an intermediate drying unit, and only partially drying the first ink via the intermediate drying unit to form a dry marginal film of the first ink at an outer marginal portion of the first ink facing away from the weblike proton-conducting membrane material before the second ink is applied while the remaining portion of the first ink remains wet;
    applying at least one layer of the second ink with a second application tool onto an outermost side of the dry marginal film of the first ink which faces away from the weblike proton-conducting membrane material while the remaining portion of the first ink underlying the dry marginal film remains wet; and
    taking of the weblike proton-conducting membrane material, which is at least partially coated with the first ink and the second ink to another drying unit, and fully drying the first ink along with fully drying the second ink such that no portion of the first ink and no portion of the second ink remains wet.

2. The method according to claim 1, wherein the first ink is applied with the first application tool on both of first and second sides of the weblike proton-conducting membrane material, and subsequently in time the second ink is applied with the second application tool on the first ink deposited on the first side of the weblike proton-conducting membrane material and on the first ink deposited on the second side of the weblike proton-conducting membrane material.

3. The method according to claim 1, wherein a layer thickness measurement is performed for the layer of the first ink after the depositing of the first ink.

4. The method according to claim 3, wherein the first ink is applied to subsequent sections of the membrane material in dependence on the measured layer thickness of preceding sections of the membrane material.

5. The method according to claim 3, wherein the second ink is deposited in dependence on the measured layer thickness of the first ink in order to limit an electrode thickness.

6. The method according to claim 1, wherein a layer thickness measurement of the electrode thickness is performed after applying the second ink, and the second ink is deposited on subsequent sections of the membrane material in dependence on a measured electrode thickness.

7. The method according to claim 1, wherein a catalyst particle charge of the weblike proton-conducting membrane material coated with the first and second inks is determined by an X-ray fluorescence analysis, and the amount of substrated catalyst particles in the first and second inks is adjusted as a function of a measured catalyst particle charge.

8. The method according to claim 1, wherein the weblike proton-conducting membrane material coated with the first and second inks is cut up into individual catalyst coated membranes.

9. The method according to claim 1, wherein a catalyst content is determined by a layer thickness measurement and/or by a charge measurement.

\* \* \* \* \*